United States Patent [19]

Watanabe et al.

[11] Patent Number: 4,739,833
[45] Date of Patent: Apr. 26, 1988

[54] METHOD OF ACIDIZING HIGH-TEMPERATURE SUBTERRANEAN FORMATIONS

[75] Inventors: David J. Watanabe, Orange; David R. Watkins, Irvine, both of Calif.

[73] Assignee: Union Oil Company of California, Los Angeles, Calif.

[21] Appl. No.: 939,411

[22] Filed: Dec. 8, 1986

Related U.S. Application Data

[63] Continuation-in-part of Ser. No. 918,555, Oct. 10, 1986, abandoned.

[51] Int. Cl.$^4$ .......................................... E21B 43/27
[52] U.S. Cl. .................................. 166/300; 166/307; 252/8.553
[58] Field of Search ............. 166/270, 271, 300, 305.1, 166/307, 309; 252/8.553

[56] References Cited

U.S. PATENT DOCUMENTS

| | | | |
|---|---|---|---|
| 1,916,122 | 6/1933 | Grebe | 252/8.55 C |
| 2,059,459 | 11/1936 | Hund et al. | 166/300 |
| 2,124,530 | 7/1938 | Loomis et al. | 252/8.55 C |
| 2,259,428 | 10/1941 | Shelley | 166/302 |
| 2,265,923 | 12/1941 | Normand | 166/307 X |
| 2,300,393 | 11/1942 | Ayers, Jr. | 252/8.55 C |
| 2,358,665 | 9/1944 | Shapiro | 252/8.55 B |
| 2,663,689 | 12/1953 | Kingston et al. | 252/8.55 C |
| 2,765,851 | 10/1956 | Bond | 252/8.55 D |
| 2,863,832 | 12/1958 | Perrine | 252/8.55 C |
| 3,096,819 | 7/1963 | White, Jr. et al. | 166/310 X |
| 3,215,199 | 11/1965 | Dilgren | 166/300 X |
| 3,288,216 | 11/1968 | Blickensderfer et al. | 166/261 X |
| 3,297,090 | 1/1967 | Dilgren | 166/300 |
| 3,307,630 | 3/1967 | Dilgren et al. | 166/300 |
| 3,379,249 | 4/1968 | Gilchrist et al. | 166/270 |
| 3,481,398 | 12/1969 | Prats | 166/251 |
| 3,506,581 | 4/1970 | Kucera | 252/8.55 C |
| 3,543,856 | 12/1970 | Knox et al. | 166/281 |
| 3,547,197 | 12/1970 | Chevalier et al. | 166/307 X |
| 3,561,533 | 2/1971 | McKinnell | 166/300 X |
| 3,572,440 | 3/1971 | Hutchinson et al. | 166/311 |
| 3,605,899 | 9/1971 | Tate et al. | 166/300 |
| 3,630,285 | 12/1971 | Claytor, Jr. | 166/300 |
| 3,695,354 | 10/1972 | Dilgren et al. | 166/272 |
| 3,828,854 | 8/1974 | Templeton et al. | 166/307 |
| 3,868,998 | 3/1975 | Lybarger et al. | 166/278 |
| 3,905,553 | 9/1975 | Bradley et al. | 166/305 R X |
| 3,937,283 | 2/1976 | Blauer et al. | 166/307 |
| 3,938,593 | 2/1976 | Friedman | 166/307 |
| 3,958,635 | 5/1976 | Zilch et al. | 166/279 |
| 4,027,731 | 6/1977 | Smith et al. | 166/267 |
| 4,044,833 | 8/1977 | Volz | 166/307 |
| 4,136,739 | 1/1979 | Salathiel et al. | 166/300 |
| 4,148,360 | 4/1979 | Watanabe | 166/300 |
| 4,203,492 | 5/1980 | Watanabe | 166/300 |
| 4,261,421 | 4/1981 | Watanabe | 166/281 |
| 4,267,887 | 5/1981 | Watanabe | 166/300 |
| 4,298,066 | 11/1981 | Colonna et al. | 166/300 |
| 4,320,014 | 3/1982 | Vivian | 252/8.55 C |
| 4,436,156 | 3/1984 | Fredrickson | 166/307 |
| 4,454,914 | 6/1984 | Watanabe | 166/266 |
| 4,480,694 | 11/1984 | Watanabe | 166/300 |

FOREIGN PATENT DOCUMENTS 2054011 2/1981 United Kingdom .

OTHER PUBLICATIONS

M. G. Hubbard, "Atomization of Treating Fluids with Nitrogen," paper presented at American Petroleum Institute Production Division Spring Meeting, Mar. 20-22, 1968.

R. L. Thomas and C. W. Crowe, "Matrix Treatment Employs New Acid System for Stimulation and Control of Fines Migration in Sandstone Formations," SPE Paper No. 7566, Society of Petroleum Engineers of AIME, 1978.

J. Z. Grens and L. B. Owen, "Field Evaluation of Scale Control Methods: Acidification," *Geothermal Resources Council, Transactions*, vol. 1, May 1977, pp. 119-121.

H. B. Clark, M. T. Pike, and G. L. Rengel, "The Use of Fluorochemical Surfactants in Non-Aqueous Stimulation Fluids," SPE Paper No. 7894, Society of Petroleum Engineers of AIME, 1979.

"New Hydrocarbon Foamer Improves Well Stimulation," *World Oil*, Aug. 1, 1979, pp. 63-64.

S. L. Phillips, A. K. Mathur, R. E. Doebler, "A Survey of Treatment Methods for Geothermal Fluids," SPE Paper No. 6606, Society of Petroleum Engineers of AIME, 1977.

*Primary Examiner*—George A. Suchfield
*Attorney, Agent, or Firm*—Dean Sandford; Gregory F. Wirzbicki; Howard R. Lambert

[57] ABSTRACT

Subterranean formations at temperatures above 250° F. are acidized by introducing a solution of a halogenated hydrocarbon and an organic solvent and allowing the halogenated hydrocarbon to hydrolyze in an aqueous medium to form a hydrohalic acid. Corrosion of metals, e.g., well casing, is inhibited by the presence of the solvent. The acidizing solution can be introduced as a liquid or as a mist in a substantially anhydrous gas. The aqueous medium can be naturally present in the formation or can be introduced into the formation as a liquid or as a foam simultaneously with the acidizing solution.

40 Claims, No Drawings

METHOD OF ACIDIZING HIGH-TEMPERATURE SUBTERRANEAN FORMATIONS

CROSS-REFERENCE TO RELATED APPLICATIONS

This application is a continuation-in-part of application Ser. No. 918,555 filed Oct. 10, 1986, now abandoned.

INTRODUCTION TO THE INVENTION

This invention relates to a method for treating a subterranean formation penetrated by a well, and more particularly concerns a method for acidizing relatively high-temperature subterranean formations penetrated by a well.

Well acidizing is a process for increasing or restoring the permeability of subterranean formations to facilitate the flow of formation fluids, such as oil, gas or a geothermal fluid, into the well from the formation, and also facilitate the injection of fluids through the well into the formation. Acidizing involves treating the formation with acid, typically a strong mineral acid such as hydrochloric acid, in order to dissolve clogging deposits, such as carbonate scale, thereby opening pores and other flow channels and increasing the permeability of the formation. Hydrofluoric acid, or a mixture of hydrofluoric and hydrochloric acids commonly known as "mud acid," is typically employed to dissolve siliceous deposits.

Numerous acidizing methods have been proposed to cope with varying well conditions and special formation problems. However, very deep oil and gas wells and geothermal wells require more complex acidizing formulations and acidizing methods, primarily due to high temperatures of formations encountered in these wells.

A problem common to many acidizing processes is a substantial corrosion of the well equipment, particularly the downhole tubing and casing which is exposed to the acidizing fluid. Because the reactivity of acids is significantly increased at higher temperatures, this corrosion of well equipment is especially serious in the acidizing of high temperature formations.

Corrosion inhibitors are generally incorporated into the acidizing fluid prior to its injection into the well. However, the effectiveness of the known corrosion inhibitors decreases at higher temperatures, and the added expense of corrosion inhibitors, which is significant even at low temperatures, becomes prohibitive at temperatures above about 250° F. Another difficulty with the known corrosion inhibitors, especially when used in the large quantities required in high temperature wells, is their tendency to form insoluble solids upon reaction with formation materials, thereby damaging the formation.

Another problem in acidizing high temperature formations is a very rapid consumption of acid by the reactive material immediately adjacent the borehole, before the acid can penetrate any significant distance into the formation. Without adequate formation penetration, the acidizing operation is of little value. In view of these problems, the prior art acidizing methods are limited, as a practical matter, to use with formations having temperatures on the order of 250° F. and below.

The aforementioned problems have been overcome to a large extent by the use of the methods disclosed in U.S. Pat. Nos. 4,148,360, 4,203,492, 4,261,421, 4,267,887, 4,454,914, and 4,480,694, wherein a substantially anhydrous organic acid precursor is injected into the formation and is allowed to hydrolyze in situ to generate a hydrohalic acid. Each of these patents is hereby incorporated by reference.

There are several objectives in using acid precursors to treat high temperature reservoirs. First, the acid precursor should not hydrolyze to form an acid to any great extent during its passage through the well equipment in order to avoid corrosion of the well equipment. Second, the acid precursor should begin to hydrolyze as soon as possible after it enters the reservoir so as to increase the permeability of the reservoir in the critical area in the immediate vicinity of the borehole. Third, the acid precursor should not completely hydrolyze until the treating fluid has been injected a substantial radial distance out into the reservoir, so as to increase reservoir permeability a substantial distance away from the borehole. Fourth, in order to accelerate the rate of hydrolysis, these two immiscible phases which have different densities, i.e., acid precursor and water, should be intimately mixed together so as to maximize their interfacial area of contact and minimize their gravity segregation.

These objectives are well achieved by the methods of the previously noted patents. However, certain improvements are desired in corrosion control and other aspects of using the methods.

SUMMARY OF THE INVENTION

The invention is a method for acidizing high-temperature subterranean formations, i.e., formations at temperatures at least about 250° F., by injecting into the formations a solution of at least one halogenated hydrocarbon acid precursor in an organic solvent which has a boiling point below about 600° F. at a pressure of 760 mm. mercury. The acid precursor hydrolyzes to form a hydrohalic acid in an aqueous medium, which medium can be present in the formation prior to injection of the acid precursor solution, or can be injected into the formation as a liquid or as a foam simultaneously with the acid precursor solution. Decreased metal corrosion results from injecting the acid precursor as a solution.

Suitable acid precursors for use in the invention are normally liquid compounds having the formula:

$$C_wH_yX_z$$

wherein: w is an integer from 1 to about 5; y is (2w+2−z); z is an integer from 1 to (2w+2); and X is one or more halogens. Suitable organic solvents include paraffinic hydrocarbons and kerosene.

Acid precursor solution is normally injected as the unaltered liquid, but also can be injected as a mist in a substantially anhydrous gas.

DETAILED DESCRIPTION OF THE INVENTION

The method of this invention is suitable for acidizing relatively high temperature subterranean formations, and finds particular utility in acidizing subterranean formations at temperatures on the order of 250° F. and higher, especially from 400° F. to 700° F. By proper selection of acid precursors described more fully hereinbelow, the method of this invention is suitable for acidizing subterranean formations containing carbonate materials, such as limestone and dolomite, siliceous materials, such as sandstone and clay, and other acid-soluble formation constituents.

The acid precursor suitable for use in the method of this invention is a normally liquid, halogenated hydrocarbon having one or two carbon atoms per molecule. More specifically, the acid precursor is a normally liquid halogenated hydrocarbon having the generalized formula:

$$C_wH_yX_z$$

wherein
w = an integer from 1 to about 5;
y = 2w+2−z
z = an integer from 1 to (2w+2); and
X is one or more halogens;
and which is thermally stable under the high temperature and pressure conditions to which it is exposed prior to hydrolysis. If z is 2 or more, X may be one or more halogens.

The term "thermally stable" as used herein is meant to exclude compounds which spontaneously decompose and/or polymerize under the temperature and pressure conditions to be encountered in the formation. Halogenated hydrocarbons which thermally decompose under the conditions encountered prior to hydrolysis are to be avoided since some of the decomposition products, such as chlorine, are highly toxic, and other of the decomposition products, such as tars resulting from the pyrolysis of halogenated unsaturated hydrocarbons or halogenated oxygen-containing organic compounds, tend to form plugging deposits which are difficult to remove.

The term "normally liquid" as used herein is meant to include those compounds which exist as liquids under the ambient temperature and pressure conditions at the well site. In general, a compound which is "normally liquid" for the purposes of this invention has a melting point less than about 80° F., and preferably less than about 30° F., and has a boiling point at 760 mm. of mercury above about 80° F., and preferably above about 170° F. Normally liquid compounds are more easily handled at the well site than are solids and are volumetrically more efficient to use than are gases. Moreover, the preferred "normally liquid" compounds exist as liquids under the expected temperaturea and pressures to which the compounds are to be exposed before and during hydrolysis. However, the use of solid or gaseous acid precursors is not excluded from the present method and is within the scope of the invention.

Furthermore, the treating fluid should not contain other materials which would adversely affect the hydrolysis rate of the acid precursor or which would form undesirable decomposition and/or pyrolytic products. The acid precursor should be substantially anhydrous so that essentially no hydrolysis thereof occurs until it mixes with water at the bottom of the well. Use of oxygen-containing compounds, including alcohols and ketones, should preferably be avoided, since at the high formation temperatures expected to be encountered these compounds tend to be corrosive, hydrolyzing some acid precursors to form acids, even in the absence of water. Since unsaturated compounds having double or triple carbon bonds, and heteroatom-containing compounds, tend to polymerize and/or pyrolyze at formation temperatures encountered in many locations, their use as acid precursors should be avoided; thus, for example, halogenated olefins should not be used as the acid precursor. Of course, the use as acid precursors of compounds which are flammable or explosive under the temperatur and pressure conditions encountered in high temperature wells should be avoided for safety considerations.

The halogenated, saturated hydrocarbon should be selected according to the reservoir temperature expected to be encountered. Although halogenated hydrocarbon compounds having as many as 5 carbon atoms may be selected for acidizing moderate temperature reservoirs, acid precursors having 3 or less carbon atoms are usually preferred for most reservoirs. For use with very high-temperature reservoirs, halogenated hydrocarbons having only a single carbon atom are the most preferred acid precursors.

Those halogenated saturated hydrocarbons having a single carbon atom per molecule and which are particularly suitable for use as an acid precursor in the method of this invention include thermally stable, normally liquid hydrocarbon compounds having the general formulas $CX_4$ or $HCX_3$. Suitable compounds with the formula $CX_4$ include: tetrachloromethane (carbon tetrachloride), fluorotrichloromethane, bromotrichloromethane and dibromodichloromethane. Suitable compounds with the formula $HCX_3$ include: trichloromethane, tribromomethane, chlorodibromomethane, bromodichloromethane, iododibromomethane, chlorodiiodomethane, iododichloromethane and fluorochlorobromomethane. As can be appreciated, however, the $CX_4$ compounds are usually preferred since each mole thereof hydrolyzes into 4 moles of acid. Of these $CX_4$ compounds, tetrachloromethane is the most preferred because of its good availability and relatively low cost.

Those halogenated hydrocarbons having two carbon atoms per molecule and which are suitable for use as an acid precursor in the method of this invention include thermally stable, normally liquid compounds having the general formula $C_2X_6$, $HC_2X_5$, $H_2C_2X_4$ or $H_3C_2X_3$. Examples of suitable $C_2X_6$ compounds are: 1,1-difluorotetrachloroethane, 1,1,2-trifluorotrichloroethane and 1,1,2-trifluorotribromoetane. Suitable $HC_2X_5$ compounds include: pentachloroethane; fluorotetrachloroethane; fluorotetrabromoethane; difluorotribromoethane; 1,2-dichloro 1,1,2-tribromoethane; 1,1-dichloro 1,2-tribromoethane; dibromotrifluoroethane; dibromotrichloroethane and fluorodichlorodibromoethane. Suitable $H_2C_2X_4$ compounds include: tetrachloroethane (both the symmetrical and unsymmetrical isomers); tetrabromoethane (both the symmetrical and unsymmetrical isomers); fluorotrichloroethane; 1-fluoro 1,1,2-tribromoethane; 1-fluoro 1,2,2-tribromoethane; difluorodichloroethane; 1,2-difluoro 1,2-dibromoethane; 1,1-difluoro 2,2-dibromoethane; chlorotribromoethane; 1,1-dichloro 1,2-dibromoethane; 1,2-dichloro 1,2-dibromoethane; 1,1-dichloro 2,2-dibromoethane and bromotrichloroethane. Examples of $H_3C_2X_3$ compounds which can be used are: 1,1,1 trichloroethane; 1,1,1 trifluoroethane or 1,1,1 dichlorofluorethane, with 1,1,1 trichloroethane being usually preferred because of its low cost and good availability.

Halogenated hydrocarbon compounds having 3 to 5 carbon atoms obviously offer a very much greater variation of halogen substitutions, and useable acid precursors in this category include such compounds as octachloropropane and heptachloropropane.

Mixtures of acid precursors can also be used, either in the form of a solution or an admixture thereof. Moreover, use of a sequence of discrete "slugs" of different acid precursors is also within the scope of the present method, but is less preferred because of the additional injection system equipment required.

Based on all or most of such considerations, halogenated hydrocarbons having only one carbon atom are, as discussed, usually preferred over those having 2 or more carbon atoms, especially for injection temperatures above about 500° F. Among halogenated hydrocarbons having only a single carbon atom, acid precursors of the formula $CX_4$ are, as noted, preferred because of the amount of acid formed, tetrachloromethane being particularly preferred because of its ability to hydrolyze readily over a wide temperature range of about 250° F. to about 700° F., as well as its mentioned low cost and good availability. However, for halogenated hydrocarbons having 2 carbon atoms, 1,1,1-trichloroethane is preferred because of its ability to hydrolyze readily (into hydrochloric and acetic acids) even at low reservoir temperatures, and for its low cost and its good availability.

In acidizing a siliceous reservoir the acid precursor either should contain fluorine, for example 1,1,2-trichlorotrifluoroethane, and thus be capable of forming hydrofluoric acid upon hydrolysis, or should be capable of forming hydrochloric, hydrobromic, or hydroiodic acid which subsequently combines with a fluoride salt, for example an ammonium fluoride solution in the water component of the treating fluid, to form hydrofluoric acid. The fluoride salt solution should preferably be neutral (i.e., have a pH about 7) so that it will not be excessively corrosive to metals. Acidic solutions can conveniently be neutralized with ammonia and other alkaline materials to achieve a desired pH.

The acid precursor hydrolyzes to form a halohalic acid. The amount of water used to form the treating fluid depends on the concentration of halohalic acid desired. For example, 10,000 gallons of hydrochloric acid of various concentrations can be generated by the hydrolysis of the following volumes of acid precursor and water, using tetrachloromethane as the acid precursor: for 5 percent by weight hydrochloric acid combine 338.5 gallons of tetrachloromethane and 9,862 gallons of water; for 7.5 percent by weight hydrochloric acid, combine 513.7 gallons of tetrachloromethane with 9,785 gallons of water; for 15 percent by weight hydrochloric acid, combine 1,064.6 gallons of tetrachloromethane and 9,532 gallons of water; for 20 percent by weight hydrochloric acid combine 1,453.1 gallons of tetrachloromethane and 9,434 gallons of water; and for 28 percent by weight hydrochloric acid, combine 2,110.7 gallons of tetrachloromethane and 9,006 gallons of water. In general about 3 to 50 gallons of water is used per gallon of acid precursor.

The organic solvent which is combined with the acid precursor to form a solution has a boiling point below about 600° F. at a pressure of 760 mm. mercury and is liquid at normal ambient temperatures, i.e., has a melting point and minimum boiling point similar to that described, supra, for the acid precursor. Preferably, the solvent will have a flash point above the highest surface temperature which will be encountered, for worker safety considerations. Typically, a flash point above 110° F. will be preferred. Mixtures of organic solvents are useful in the practice of the invention, but no component of the mixture should have a boiling point above about 600° F. Suitable organic solvents include, without limitation, branched and unbranched paraffins and various petroleum distillate fractions such as kerosene and distillate fuels. As discussed, supra, in connection with the description of acid precursors, unsaturated compounds (including aromatic compounds) and heteroatom-containing compounds should be avoided to prevent polymerization and/or pyrolysis at high formation temperatures.

Kerosene has been found particularly useful as the organic solvent for this invention, and is otherwise desirable for its relative low cost, as compared to many other useful materials. Acid precursors such as tetrachloromethane are completely miscible with kerosene, which prevents separation of the solution components when the solution contacts aqueous media. Equivolume mixtures of tetrachloromethane and kerosene have densities approximately that of water, which helps to prevent segregation of organic particles from water when the fluids are mixed. By appropriate choices of ratios, the density of tetrachloromethanekerosene solutions can be made close to the density of most connate waters in subterranean formations.

In the method of this invention, a treating fluid comprising a solution of the acid precursor and organic solvent is introduced through a well and into the subterranean formation to be acidized. During its passage through the well, the treating fluid should be maintained in a substantially anhydrous state to avoid premature hydrolysis and the resulting corrosion of the injection equipment. The term "substantially anhydrous" as used herein is meant to include treating fluids having not more than a minor amount of water. The amount of water which can be tolerated in the treating fluid depends primarily upon the temperature to which the treating fluid is heated during its passage through the well. For example, at relatively low treating fluid temperatures, such as temperatures on the order of 250° to 300° F., water concentrations of about 10 weight percent may be acceptable because the acid precursor and water are immiscible and therefore do not hydrolyze readily. However, at relatively high treating fluid temperatures, such as on the order of 500° to 700° F., water concentrations must be less than about 1 weight percent due to the accelerated rate of hydrolysis at these temperatures. For the purposes of this invention, a treating fluid is "substantially anhydrous" when it contains less than the amount of water required to cause a significant amount of hydrolysis during passage through the well, which significant amount results in an unacceptable rate of corrosion of the injection equipment. Best results are obtained when the treating fluid is introduced into the well as an anhydrous liquid.

The introduction of the treating fluid into the subterranean formation can be accomplished by a variety of well-known fluid injection methods, provided that the treating fluid is not prematurely mixed with water. In one embodiment of the method of this invention, the substantially anhydrous treating fluid and an aqueous medium are injected through a well into the subterranean formation. Both the substantially anhydrous treating fluid and the aqueous medium may be introduced through an injection tubing, such as in the form of a plurality of small, discrete alternating slugs. Because the treating fluids are relatively insoluble in water there will be little hydrolysis during the passage through the injection tubing at these temperatures. Alternatively, a slug of the substantially anhydrous treating fluid may be injected through a water-free injection tubing, and the aqueous medium may be injected through the well annulus between the injection tubing and the walls of the borehole. In either case, the injected fluids are preferably displaced from the well into the formation by an inert displacement fluid which is injected through the injection tubing and/or well annulus to displace the mixed treating fluid and aqueous medium into the formation. This latter-described procedure is preferred because it provides for mixing of the treating fluid and aqueous medium in the borehole prior to entry into the formation, and yet, because the hydrolysis rate is relatively slow, the hydrohalic acid is not produced to any significant extent until the reaction mixture has been displaced into the formation.

The displacement fluid can be any inert fluid, such as nitrogen or an aqueous or oleaginous fluid which is noncorrosive and nonplug-forming under the conditions encountered in the well. Preferred aqueous displacement fluids contain ammonium chloride, ammonium iodide, ammonium bromide salts or the like which serve to stabilize any water-swellable clays in the formation. Preferred oleaginous displacement fluids are the solvent-refined, paraffinic lubricating oil base stocks, known as neutral oils and bright stocks, such as are used conventionally for lubrication in industrial turbines and other machines operating at high temperatures.

For acidizing siliceous formations, the method can be modified by incorporating water-soluble fluoride salts into the aqueous medium. Chlorine-containing acid precursors will hydrolyze to form hydrochloric acid, which reacts with water-soluble fluoride salts to form hydrofluoric acid.

The factors to be considered in selecting the quantity of acid precursor and/or water to be injected in the method of this invention are essentially the same as in a conventional acidization operation. By way of example, an acid treatment which would conventionally call for the use of about 100 gallons of an acid solution containing 12 weight percent hydrochloric acid and 3 weight percent hydrofluoric acid per foot of perforated interval, requires the injection of about 12.2 gallons of tetrachloromethane and, in a relatively water-free formation, about 100 gallons of a 5.5 weight percent aqueous ammonium fluoride solution. In a water-containing formation, the volume of the fluoride salt solution to be injected may be reduced and a higher concentration of the fluoride salt employed to form the desired concentration of hydrofluoric acid upon dilution with the connate water. The design of a particular acidization operation using the method of this invention will therefore become apparent to those skilled in the art from these well known factors when taken in view of this disclosure.

After displacement of the injected fluids into the formation, the well is shut in for a sufficient time to allow the acid precursor to hydrolyze and the in situ-produced acid to be consumed in the desired acidization of formation materials. The degree of hydrolysis achieved in situ is determined by the length of time the well is shut in, the formation temperature, and other factors. When less than complete hydrolysis is achieved, precautions must be taken to handle the unreacted acid precursor and any noxious intermediate reaction products. After the acid has reacted, the borehole is preferably flushed with a conventional well cleaning fluid, such as water, and the well effluent is contacted in a pit or other contacting device with a dilute ammonium hydroxide solution for a short time prior to returning the well to its normal injection or production operation.

A foamed acidizing procedure has been found to be quite effective, when aqueous matter is to be injected. In this modification, a surfactant and gas are added to the aqueous matter to form a foam, which is injected for reaction with the acid precursor. Among the useful surfactants are the presently preferred quaternary ammonium cationic surfactants.

The preferred quaternary ammonium cationic surface active agent component comprises an organic nitrogen compound in which the molecular structure includes a nitrogen atom attached to four individual organic groups, multivalent nitrogen ring compounds such as lauryl pyridinium chloride, and the like. Selected classes of quaternary ammonium compounds include those generally corresponding to the formulas

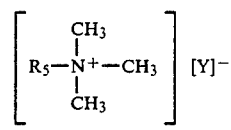

and

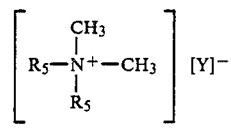

wherein the $R_5$ groups can be the same or different organic groups such as straight, branched, or cyclic, saturated or unsaturated, substituted or unsubstituted groups containing from about 2 to about 18 carbon atoms, and Y is an anion such as chloride, iodide, bromide, sulfate and the like. Specific quaternary compounds which can be employed include, for example, alkyl benzyl dimethyl ammonium chloride wherein the alkyl group contains from about 8 to about 18 carbon atoms; alkyl trimethyl ammonium chloride wherein the alkyl group is selected from octyl, nonyl, decyl, dodecyl, tridecyl, tetradecyl, hexadecyl, ocatdecyl, ocatadecenyl, and octadecandienyl; dialkyl dimethyl ammonium chloride wherein the alkyl groups are the same or different members of the groups of alkyl radicals set forth above in describing the alkyl trimethyl ammonium chloride; quaternary ammonium chlorides, corresponding to the formula

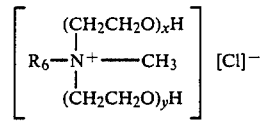

wherein $R_6$ is a $C_3$ to $C_{18}$ hydrocarbon and x and y can range from about 1 to 20; mixtures of the various quaternary ammonium compounds; and the like.

The surfactant will be used in amounts about 0.005 to about 1 percent by weight of the aqueous matter. The gas is preferably a noncorrosive gas such as nitrogen, and typically will be present at about 0.1 to about 20 volumes per volume of aqueous matter.

The use of a foamed treatment of this invention can result in many of the advantages derived from the use of conventional foamed aqueous acid solutions, such as (1) a reduction in clean up time due to a lower hydrostatic head in the well and the backflushing action of the gas in the foam as pressure is released and (2) deeper penetration of the acid into the formation due to the large volumes of gas injected as well as reduced fluid loss to adjacent formations. The foamed treatments of this invention are also used to great advantage in fracture-acidizing methods. And, of course, the use of the substantially anhydrous treating fluids of this invention are best suited to high-temperature formations where the known foamed acidizing methods are unsuitable.

The invention can also be modified, with significant benefits, by injecting a solution of an acid precursor and an organic solvent as a mist in a substantially anhydrous gas. This provides an ability to control the hydrolysis rate of acid precursors.

One factor affecting the rate of acid precursor hydrolysis is the reservoir temperature. All other factors being equal, the higher the temperature of the reservoir, the higher the rate of hydrolysis. Another factor affecting the rate of hydrolysis is the unit interfacial area of contact between the acid precursor and the water in the treating fluid. All other factors being equal, the greater the unit interfacial area of contact between these two immiscible liquids, the higher the rate of hydrolysis. Thus, it is evident that to uniformly acidize both a relatively hot high-temperature reservoir (near 700° F.) and a relatively cooler high-temperature reservoir (near 250° F.), it is necessary to increase the unit interfacial area of contact between the acid precursor and the water in the treating fluid used to treat the relatively cooler high-temperature reservoir, as compared to the treating fluid used to treat the relatively hot high-temperature reservoir. As will be explained more fully hereinbelow, the unit interfacial area of contact between the acid precursor and the water is controlled by the degree of atomization of the acid precursor solution in the mist of acid precursor solution in an anhydrous gas. That is, the smaller the particles of acid precursor solution in the mist, the higher the unit interfacial area of contact between the acid precursor and the water.

The selection of the anhydrous gas for use in the mist component of the acidizing treating fluid of this invention is not critical, but rather is made in view of factors known to those skilled in the art, such as the cost and availability as well as the corrosivity and other handling characteristics of the gas.

The amount of gas employed will depend on the apparatus used to atomize the acid precursor and the desired particle size of the acid precursor solution. As used herein, the "volume of gas per volume of acid precursor solution" refers to the ratio of the volume of the gas, calculated at the anticipated downhole temperature and pressure conditions during injection of the treating fluid, to the volume of the liquid acid precursor solution. Typically, between about 0.1 to 20 volumes of gas per volume of acid precursor solution will be used in the method of this invention.

The introduction of the treating fluid into the subterranean reservoir can be accomplished by a variety of well-known fluid injection methods. One method for injecting the treating fluid comprises running a dry, or substantially dry, injection tubing into the well; generating the desired quantity of mist of an acid precursor solution in an anhydrous gas at the surface of the well; injecting the mist down the injection tubing; simultaneously injecting the desired quantity of water down the well annulus between the injection tubing and the casing or borehole sidewall, whereby the mist mixes with the water at the bottom of the well to form a dispersion of finely divided particles of acid precursor solution and anhydrous gas in the water; and displacing the treating fluid into the reservoir by means of a displacement fluid. The displacement fluid can be any inert fluid, such as nitrogen or an aqueous or oleaginous fluid which is noncorrosive and nonplug- forming under the conditions encountered in the injection tubing. Alternatively, the mist of an acid precursor solution in an anhydrous gas, followed by the displacement fluid, can be introduced down the well annulus and the water (if used) can be injected down the injection tubing.

In still another embodiment of the invention, two separate injection tubings are run into a well, with the two injection tubings coming together near the bottom of the well to form a single tubing which extends a short distance further into the well. The acid precursor solution is injected down the well through one of the injection tubings, and the anhydrous gas is injected through the other of the injection tubings. At the point where the two injection tubings come together downhole to form a short section of a single injection tubing which extends further downhole, the acid precursor solution and anhydrous gas mix to form the mist. A stream of water can be injected into the well through another conduit to form a dispersion of particles of acid precursor solution and anhydrous gas in water. After hydrolysis of the acid precursor begins, the dispersion is injected into the reservoir.

"Atomization" or "atomizing" is the mechanical subdivision of a bulk liquid into various sized particles or units of liquid. In referring generally to the size of particles formed during atomizing, "sprinkling" suggests the production of very coarse drops, e.g., more than 1,000 micrometers in diameter; "spraying" usually implies the production of coarse drops, e.g., 100 to 1,000 micrometers; "misting" is the production of fine drops, e.g., 10 to 100 micrometers and "neublizing" is the production of very fine drops, e.g., less than 10 micrometers. In this invention it is intended that the term "atomizing" refers to the production of the entire range of the above-described particle sizes. More specifically, "atomizing" refers to the production of particles having a diameter of less than about 10,000 micrometers, preferably less than about 1,000 micrometers. As used in the description of this invention, the term "mist" is intended to refer to a dispersion of particles of acid precursor solution in an anhydrous gas produced by atomization and is not limited to the production of only 10 to 100 micrometer sized drops.

Any of the common methods for atomizing a liquid into a stream of gas can be utilized in this alternative of the invention. Suitable techniques include: hydraulic or pressure atomizing using a simple jet, two impinging jets or a swirl jet; pneumatic or two-fluid atomizing nozzles having either an internal mix or an external mix; and rotary or spinning disk atomizers of the film, vaned or perforated head type.

The following example is illustrative of various aspects of the invention and is not intended to limit the invention, the scope of the invention being fully defined by the appended claims.

EXAMPLE

An experiment is performed to determine the corrosion of steel, as acid is formed at elevated temperatures from the hydrolysis of an acid precursor.

In this experiment, glass tubes (approximately 0.5 inches outside diameter and 12 inches in length, sealed at one end and provided with a constriction approximately at the midpoint of the length) are charged with 10 cubic centimeters of water and either 1 cubic centimeter of tetrachloromethane or 2 cubic centimeters of an equivolume mixture of tetrachloromethane and kerosene. Either a weighed chip of calcium carbonate or a weighed and measured coupon of N-80 steel (each having a size which will not pass through the constriction in the tube) is placed in the tube, and the open end of the tube is sealed using a flame.

The sealed tube is inserted into a metal bomb, which is capped and pressurized to 500 p.s.i.g. with nitrogen gas. The bomb is placed in a rocking device, in an autoclave, and a thermocouple is placed in contact with the wall of the bomb. Heating of the autoclave is begun and, after a predetermined bomb temperature has been attained, the rocking action is started, causing the liquid to alternatively cover and uncover the solid particle. This rocking is continued for a predetermined time, after which the bomb is removed and allowed to cool, with the liquid and solid materials separated.

After cooling, the glass is removed and is broken for recovery of the calcium carbonate or steel particle. Weight loss of the calcium carbonate is used to calculate the extent of tetrachloromethane hydrolysis to hydrochloric acid. Weight loss of the steel coupon is used to determine the corrosion rate. Results of several runs are summarized in Table 1, where "% Acid" indicates the extent of tetrachloromethane hydrolysis (as a percentage of theoretical hydrochloric acid formation) and corrosion is expressed in pounds per square foot. The results are arranged to facilitate comparisons for various durations of reaction, at approximately equivalent temperatures, and show that corrosion is significantly reduced by the addition of kerosene, while the hydrolysis rate of tetrachloromethane is not appreciably altered. This is particularly the case at the higher temperatures, where corrosion occurs at much higher rates.

TABLE 1

| Reaction Time (hrs) | Temperature (°F.) | CCl$_4$ % Acid | CCl$_4$ Corrosion | CCl$_4$ + Kerosene % Acid | CCl$_4$ + Kerosene Corrosion |
|---|---|---|---|---|---|
| 0.5 | 125 | 0.16 | 0.001 | 0.12 | 0.001 |
| 1 | 125 | 0.09 | 0.003 | 0.30 | 0.001 |
| 5 | 135 | — | — | 0.21 | 0.006 |
| 0.5 | 162 | 0.16 | 0.003 | 0.11 | 0.003 |
| 1 | 175 | 0.00 | 0.009 | 0.75 | 0.003 |
| 5 | 186 | — | — | 0.18 | 0.016 |
| 0.5 | 210 | 0.20 | 0.017 | 0.09 | 0.006 |
| 1 | 210 | 0.27 | 0.026 | 1.5 | 0.010 |
| 0.5 | 240 | 0.57 | 0.032 | 0.30 | 0.015 |
| 1 | 250 | 1.73 | 0.057 | 2.56 | 0.028 |
| 5 | 232 | — | — | 0.61 | 0.056 |
| 0.5 | 285 | 2.4 | 0.060 | 2.2 | 0.032 |
| 1 | 290 | 14.0 | 0.139 | 6.75 | 0.059 |
| 5 | 274 | — | — | 6.90 | 0.165 |
| 0.5 | 360 | 71.4 | 0.310 | 57.9 | 0.099 |
| 1 | 350 | 59.2 | 0.228 | 42.1 | 0.130 |
| 5 | 355 | — | — | 99.0 | 0.215 |
| 0.5 | 468 | 99.8 | 0.394 | 100 | 0.145 |
| 1 | 478 | 100 | 0.400 | 100 | 0.241 |
| 5 | 502 | — | — | 100 | 0.272 |

Various embodiments and modifications of this invention have been described in the foregoing discussion and example, and further modifications will be apparent to those skilled in the art. Such modifications are included within the scope of the invention as defined by the following claims.

What is claimed is:

1. A method for acidizing a subterranean formation at temperatures at least about 250° F., which method comprises:

(a) forming a treating fluid comprising a solution of at least one halogenated hydrocarbon acid precursor and an organic solvent having a boiling point below about 600° F. at a pressure of 760 mm. mercury;

(b) introducing the treating fluid into the formation; and (c) allowing the acid precursor to hydrolyze in an aqueous medium to form a hydrohalic acid.

2. The method defined in claim 1, wherein the acid precursor comprises a normally liquid compound having the formula:

$$C_w H_y X_z$$

wherein: w is an integer from 1 to about 5; y is $(2w+2-z)$; z is an integer from 1 to $(2w+2)$; and X is one or more halogens.

3. The method defined in claim 2, wherein w is one or two.

4. The method defined in claim 1, wherein the acid precursor is selected from the group consisting of tetrachloromethane, bromotrichloromethane, trichloromethane, pentachloroethane, tetrachloroethane, 1,1,2-trichlorotrifluoroethane, fluorotetrachloroethane, fluorotrichloroethane, and mixtures thereof.

5. The method defined in claim 1, wherein the acid precursor comprises tetrachloromethane.

6. The method defined in claim 1, wherein the treating fluid is introduced into the formation as a mist, wherein particles of acid precursor solution are less than about 10,000 micrometers in diameter, in a substantially anhydrous gas.

7. The method defined in claim 6, wherein the gas comprises nitrogen.

8. The method defined in claim 6, wherein the mist is formed before treating fluid is introduced into the formation.

9. The method defined in claim 6, wherein the mist is formed in a well which penetrates the formation.

10. The method defined in claim 6, wherein the mist contains about 0.1 to about 20 volumes of gas per volume of acid precursor solution, calculated at the temperature and pressure conditions of the formation.

11. The method defined in claim 1, wherein the treating fluid and aqueous medium are introduced into the formation, through separate conduits.

12. The method defined in claim 11, wherein about 3 to about 50 volumes of aqueous medium are introduced, per volume of treating fluid.

13. The method defined in claim 11, wherein the introduced aqueous medium is a foam, comprising water, a surfactant, and a gas.

14. The method defined in claim 13, wherein the surfactant is a quaternary ammonium cationic surfactant.

15. The method defined in claim 11, wherein the introduced aqueous medium contains a dissolved fluoride salt.

16. The method defined in claim 15, wherein the introduced aqueous medium has pH values about 7.

17. The method defined in claim 1, wherein the organic solvent is selected from the group consisting of paraffinic hydrocarbons, kerosene, and mixtures thereof.

18. The method defined in claim 1, wherein the organic solvent comprises kerosene.

19. The method defined in claim 1, wherein the treating fluid is substantially free of heteroatom-containing compounds and unsaturated compounds.

20. A method for acidizing a subterranean formation at temperatures at least about 250° F., which method comprises:
 (a) forming a treating fluid comprising a solution of:
  (i) a normally liquid acid precursor having the formula:

$C_wH_yX_z$ wherein w is an integer from 1 to about 5, y is (2w+2−z), z is an integer from 1 to (2w+2), and X is one or more halogens; and
  (ii) an organic solvent having a boiling point below about 600° F. at a pressure of 760 mm. mercury and selected from the group consisting of paraffinic hydrocarbons, kerosene, and mixtures thereof;
 (b) introducing the treating fluid into the formation; and
 (c) allowing the acid precursor to hydrolyze in an aqueous medium to form a hydrohalic acid.

21. The method defined in claim 20, wherein w is one or two.

22. The method defined in claim 20, wherein the acid precursor is selected from the group consisting of tetrachloromethane, bromotrichloromethane, trichloromethane, pentachloroethane, tetrachloroethane, 1,1,2-trichlorotrifluoroethane, fluorotetrachloroethane, fluorotrichloroethane, and mixtures thereof.

23. The method defined in claim 20, wherein the acid precursor comprises tetrachloromethane.

24. The method defined in claim 20, wherein the organic solvent comprises kerosene.

25. The method defined in claim 20, wherein the treating fluid and aqueous medium are introduced into the formation, through separate conduits.

26. The method defined in claim 25, wherein about 3 to about 50 volumes of aqueous medium are introduced, per volume of treating fluid.

27. The method defined in claim 25 wherein the introduced aqueous medium contains a dissolved fluoride salt.

28. The method defined in claim 25, wherein the introduced aqueous medium is a foam, comprising water, a surfactant, and a gas.

29. The method defined in claim 28, wherein the surfactant is a quaternary ammonium cationic surfactant.

30. The method defined in claim 20, wherein the treating fluid is introduced into the formation as a mist, wherein particles of acid precursor solution are less than about 10,000 micrometers in diameter, in a substantially anhydrous gas.

31. The method defined in claim 30, wherein the mist is formed before treating fluid is introduced into the formation.

32. The method defined in claim 30, wherein the mist is formed in a well which penetrates the formation.

33. The method defined in claim 30, wherein the mist contains about 0.1 to about 20 volumes of gas per volume of acid precursor solution, calculated at the temperature and pressure conditions of the formation.

34. A method for acidizing a subterranean formation at temperatures at least about 250° F., which method comprises:
 (a) forming a treating fluid consisting essentially of a solution of:
  (i) one or more normally liquid acid precursors having the formula:

$C_wH_yX_z$ wherein w is an integer from 1 to about 5, y is (2w+2−z), z is an integer from 1 to (2w+2), and X is one or more halogens; and
  (ii) one or more organic solvents having a boiling point below about 600° F. at a pressure of 760 mm. mercury and selected from the group consisting of paraffinic hydrocarbons, kerosene, and mixtures thereof;
 (b) introducing the treating fluid into the formation, and
 (c) allowing the acid precursor to hydrolyze in an aqueous medium to form a hydrohalic acid.

35. The method defined in claim 34, wherein w is one or two.

36. The method defined in claim 34, wherein the acid precursor is selected from the group consisting of tetrachloromethane, bromotrichloromethane, trichloromethane, pentachloroethane, tetrachloroethane, 1,1,2-trichlorotrifluoroethane, fluorotetrachloroethane, fluorotrichloroethane, and mixtures thereof.

37. The method defined in claim 34, wherein the acid precursor is tetrachloromethane.

38. The method defined in claim 34, wherein the organic solvent is kerosene.

39. The method defined in claim 34, wherein the treating fluid and aqueous medium are introduced into the formation through separate conduits.

40. The method defined in claim 34, wherein the introduced aqueous medium contains a dissolved fluoride salt.

* * * * *